United States Patent
Ahuja et al.

(10) Patent No.: US 6,751,669 B1
(45) Date of Patent: Jun. 15, 2004

(54) MULTIMEDIA MULTIPARTY COMMUNICATION SYSTEM AND METHOD

(75) Inventors: Sudhir Raman Ahuja, Aberdeen Township, Monmouth County, NJ (US); Murali Aravamudan, Red Bank, NJ (US); James Robert Ensor, Red Bank, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 08/822,727

(22) Filed: Mar. 24, 1997

(51) Int. Cl.[7] .......................... G06F 15/16; H04Q 11/04
(52) U.S. Cl. ...................... 709/228; 709/204; 709/230; 370/261
(58) Field of Search ...................... 395/200.33, 200.34, 395/200.57, 200.58, 200.62; 709/203, 204, 205, 227, 228, 232, 230; 370/261, 260, 262

(56) References Cited

U.S. PATENT DOCUMENTS

| | | | | |
|---|---|---|---|---|
| 5,195,086 A | * | 3/1993 | Baumgartner et al. | 370/62 |
| 5,329,619 A | * | 7/1994 | Page et al. | 395/200 |
| 5,422,883 A | * | 6/1995 | Hauris et al. | 370/261 |
| 5,539,813 A | * | 7/1996 | Jonsson | 379/202 |
| 5,584,025 A | * | 12/1996 | Keithley et al. | 395/615 |
| 5,610,841 A | * | 3/1997 | Tanaka et al. | 364/514 |
| 5,619,555 A | * | 4/1997 | Fenton et al. | 379/67 |
| 5,764,750 A | * | 6/1998 | Chau et al. | 379/229 |
| 5,793,365 A | * | 8/1998 | Tang et al. | 345/329 |
| 5,854,898 A | * | 12/1998 | Riddle | 709/227 |
| 6,212,547 B1 | * | 4/2001 | Ludwig et al. | 709/204 |

OTHER PUBLICATIONS

Kishimoto, R,"Agent communication systems for multimedia communication services," NTT Opt. Network Syst. Labs, Kanagawa Japan, INFOCOM '96, IEEE, Mar. 24–28, 1996, pp. 10–17 vol. 1.*

Seungchul et al., "A call model for multimedia multiuser communication platform," Network Protocols, 1995. Proceedings., 1995 International Conference on , Nov. 7–10, 1995, pp.:305–312.*

Nahrstedt, K et al. "The QOS Broker," Pennsylvania Univ., Multimedia, IEEE, spring 1995, pp.53–67 v.2 issue 1.*

Chang et al. "Call processing and signaling in a desktop multimedia conferencing system," Global Telecommunications Conference, 1992. Conference Record., GLOBECOM '92. 'Communication for Global Users'., IEEE , Dec. 6–9, 1992 □□ pp.:225–229 vol. 1.*

Lamport , L. "Time, Clocks, and the Ordering of Events in a Distributed System", Communication of the Association for Computing Machinery, pp. 558–565, Jul. 1978.*

(List continued on next page.)

Primary Examiner—Dung C. Dinh (57) ABSTRACT

A multimedia multiparty communication system and method which includes one or more "agents" and one or more "brokers". Each communication session is managed by a broker which creates and maintains the session. An agent may cause a broker to alter a communication session by entering into "negotiations" with the broker. It is also possible for an agent, through the broker, to enter into negotiations with one or more other agents. Negotiations, between agents and between agents and brokers may consist of any number of exchanged messages (or "offers"), thereby allowing for the dynamic negotiations necessary for effective multimedia multiparty communications.

8 Claims, 5 Drawing Sheets

OTHER PUBLICATIONS

Robert Orfali, et al., *Client/Server with Distributed Objects*, Byte, pp. 151–162, Apr. 1995.

Kenneth P. Berman, *The Process Group Approach to Reliable Distributed Computing*, Communications of the ACM, vol. 36, No. 12, pp. 37–53, 103, Dec. 1993.

ITU–T Recommendation H. 120, *Codecs for Videoconferencing Using Primary Digital Group Transmission*, International Telecommunication Union, Mar. 1993.

"Communique! 4.2.1: Collaborative Computing And Desktop Videoconferencing," MDL Corporation, (product literature available in 1993, website information as of Oct. 17, 1997 at http://www.mdlcorp.com/insoft/products/c/c.html).

* cited by examiner

MULTIMEDIA MULTIPARTY COMMUNICATION SYSTEM AND METHOD

TECHNICAL FIELD

This invention relates to the building and using of communication services, and more particularly to a protocol for building and using computer based communication services.

BACKGROUND OF THE INVENTION

The client-server model is currently the most popular model for building and using computer based communication services. The model represents the user of a service as a client that sends requests to, and receives responses from, a server. In a typical client-server architecture, both the client and server are computing facilities, and the request-response pair is implemented through distributed software using method invocation. For an example of how a client-server architecture is implemented through distributed software see: Orfali and Harkey, "Client/Server with Distributed Objects", Byte Magazine, April, 1995, pp. 151–162.

The distributed software client-server architecture is well suited for those applications in which requests and responses are limited and inflexible, such as in those situations where the user and/or server has access to limited computing facilities. For example, the user facility may be a telephone set and the server facility may be a voice conference bridge that simply responds to requests initiated by the user with the telephone set.

However, the client-server model is not well-suited for the development of services that involve more extensive interactions. Two services which often involve extensive interactions are multimedia services and multiparty services. Such services include, for example, a user who might want to choose a video conferencing service based on the cost at the time of use. As another example, two users might decide to interact through both voice and video only after they have exchanged several messages. As a further example, a video bridging server might interact with several logging servers before locating one that can store video minutes of a meeting under some set of constraints. In these types of services, interactions between a user and a server, between users, or between servers may take on the form of "negotiations", a form of interaction to which the client-server architecture does not lend itself.

SUMMARY OF THE INVENTION

It has been recognized that in order to support a wide range of new communication services, it is highly desirable to have a software framework that permits not only the fixed, negotiations associated with remote procedure calls, but also the dynamic, protracted negotiations associated with peer-to-peer interactions. The present invention provides a software framework that permits dynamic negotiation.

In a communication system in accordance with the present invention a communication session involves one or more "agents" and one or more "brokers". Each communication session is managed by a broker which creates and maintains the session. An agent may cause a broker to alter a communication session by entering into "negotiations" with the broker. It is also possible for an agent, through the broker, to enter into negotiations with one or more other agents. Negotiations, between agents and between agents and brokers may consist of any number of exchanged messages (or "offers"), thereby allowing for the dynamic negotiations necessary for effective multimedia multiparty communications.

DETAILED DESCRIPTION

The present invention is based upon a "broker-agent" communication model. In the broker-agent model, a negotiation is defined as a sequence of offers, where an offer is a message and the computation that defines its interpretation. The model focuses on relationships among offers, and thus provides means for one to define a negotiation as relations among offers. The relations that form a negotiation description define the parties to the negotiation and the characteristics of the offers exchanged among those parties.

In addition to emphasizing relations, the broker-agent model emphasizes party and offer characteristic descriptions. The components of these descriptions are termed attributes. Attributes may be organized by type. For example, one characteristic of an offer is its originator. For a particular offer, the value of this originator attribute may be classified as belonging to type "server", or the originator attribute may be classified as belonging to type "negotiating party".

Having described the underlying concepts of the broker/agent model, a description of a communication system in accordance with the broker/agent model is presented below.

Figure 1:
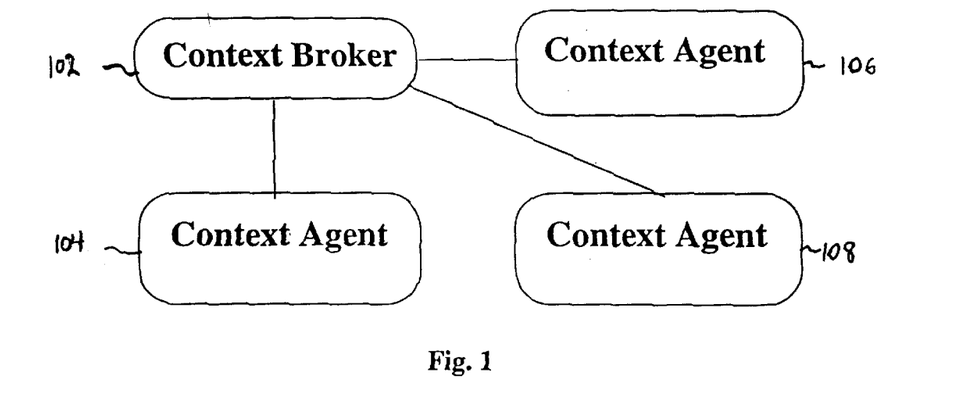
FIG. 1 is a block diagram depicting a single broker communication system in accordance with the present invention.

Referring to FIG. 1, there is shown a communication system in accordance with the present invention. The system includes a Context Broker (CB) 102 and three Context Agents (CAs) 104, 106 and 108. For purposes of illustration, the Broker of FIG. 1 is said to be a general purpose computer running broker software, while the Agents of FIG. 1 are each said to be a general purpose computer running agent software. It should be noted, however, that in practice both the Broker and Agents may take any one of many possible forms. For example, the Context Broker may be a telephone network switch that is appropriately configured; while the Context Agent can be a telephone set, or a telephone set interfaced with an agent computer via Dual Tone Frequency Modulation (DTFM) signaling. In any event, each communication session occurring in the system of FIG. 1 is created and maintained (managed) by only one entity, the Context Broker (CB) 102 (although, in general, a given context broker can manage several communication sessions). The Context Agents (CAs) 104, 106 and 108 use the Context Broker to establish communication sessions.

Figure 2:
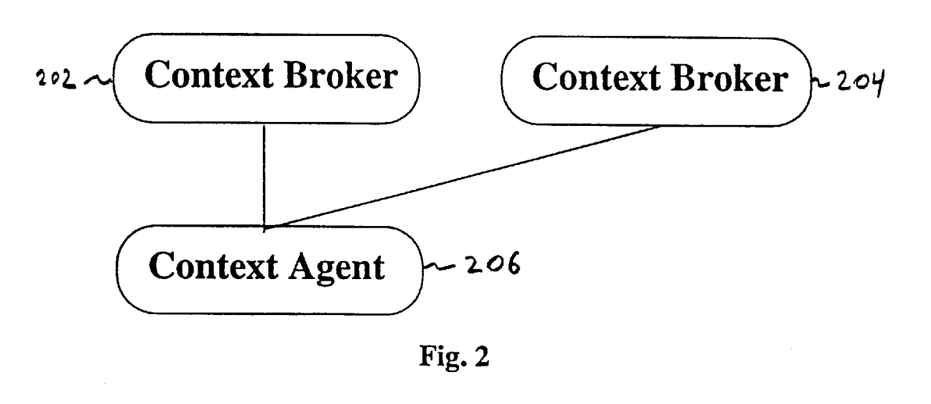
FIG. 2 is a block diagram depicting a multiple broker communication system in accordance with the present invention.

FIG. 2 shows an alternative broker-agent embodiment in which the communication system of includes two Context Brokers 202 and 204, and a single Context Agent 206. As can be seen from the figure, there can be multiple context brokers in a communication system even though each communication session is always managed by one context broker. That is, management of a communication session itself is never distributed, but a context agent can converse with more than one Context Broker for the purpose of participating in multiple communication sessions.

At this point, prior to describing the negotiation protocol in detail, it will be helpful to describe an illustrative negotiation with reference to FIG. 1. In this regard, FIG. 1 will now be assumed to represent a "video on demand" scenario, with Context Agent 108 representing a video server, Context Agent 104 representing a first viewer's home computer, and Context Agent 106 representing a second viewer's home computer. It is further assumed that the viewer computers are equipped with the appropriate agent software and are capable of displaying any received video. The Context Broker 102 is assumed to be operated by a network that couples the viewers to the server.

Assume that viewer 104 is watching a movie supplied by server 108 (through Broker 102) and that viewer 106 enters a request for service. Viewer 106's request (sent to Broker 102) may be for Movie "X" at time "Y". Broker 102 may then negotiate with server 108 to see if Movie X is available to be shown to viewer 106 at time Y. The Broker may do this by sending the following sequence of messages (offers) to server 108: "Do you have Movie X?", "Can you show it at time Y?". If the answers from the video server are: "Yes", "No, but the movie is currently in progress"; then the Broker responds to viewer 106 with an appropriate message such as: "Movie X is available but not at time Y, do you wish to join the movie in progress?". If the answer from viewer 106 is yes, the Broker adds viewer 106 to the communication session that exists between server 108 and viewer 104.

Moreover, the negotiations between the Broker and the video server may be dynamic. That is, viewer 106 may vary the number and/or type of conditions included in the request. For example, as an alternative to the request described above, viewer 106 may ask for Movie X, at time Y, at a price less than $5.00. In that case, the broker/server negotiation would extend to three inquiries: "Do you have Movie X?"; "Can you show it at time Y?", "Can you show Movie X for less than $5.00?".

In the above described "video on demand" negotiation, broker 102 negotiated with server 108 on behalf of viewer 106. As an alternative to the above scenario, viewer 106 may negotiate with server 108 directly, with broker 102 merely acting as a conduit for messages passing between the two viewers. Thus, if viewer 106 requests service, broker 102 establishes a communication link between viewer 106 and server 108, and thereafter viewer 106 and server 108 negotiate directly with broker 102 merely relaying messages between the two.

Having described an illustrative negotiation, the negotiation protocol is now described in detail below.

The following list contains the communication session (or "context") manipulation operations that may be performed during a negotiation. Each operation is a transaction initiated by a Context Agent and directed to a Context Broker. The Context Broker may involve one or more Context Agents in the transaction based on the operation. Since the Context Broker is the manager of a context, the Context Broker ensures closure of all transactions concerning the context. The operations are atomic operations as far as the context is concerned, although each operation may involve many steps. These atomic context operations are used to build more complex transactions needed by some advanced telecommunication services. In the description that follows, each transaction is specified as a method invocation with parameters. Each transaction consists typically of a Transaction_Begin, GenericNegotiate, and Transaction_End steps. The GenericNegotiate step can happen a finite number of times, during which the Context Broker just acts as a conduit between the Context Agents. The terms "member" and "Context Agent" are used interchangeably in the ensuing discussion.

1. CreateContext: This transaction is used to create a new context with certain specified attributes. A Context Agent issues a CreateContext_Begin to the Context Broker to create a new context. On successful creation of the context, the Context Broker sends a CreateContext_End to the Context Agent.

CreateContext_Begin (NegotiationId, SrcInfo, ContextAttributes)

CreateContext_End (NegotiationId, Result, ContextHandle, ContextAttributes)

2. DestroyContext: This transaction is used to destroy a context. A Context Agent issues a DestroyContext_Begin to the Context Broker to destroy a context. On successful destruction of the context, the Context Broker sends a DestroyContext_End to the Context Agent.

DestroyContext_Begin (NegotiationId, SrcInfo, ContextHandle)

DestroyContext_End (NegotiationId, ContextHandle, Result)

3. AddMember: This transaction is used to add a new member to the specified context. A Context Agent issues a AddMember_Begin to the Context Broker to add a new member. The Context Broker will send an AddMember_Invite to the Context Agent who is being added. The invited Context Agent can either send a AddMember_End to the Context Broker or prolong the negotiation by sending a GenericNegotiate to the calling member (or any other member of the context) through the Context Broker. The Context Broker does not interpret the GenericNegotiate and just passes it to the right destination member. The Context Broker closes the transaction when the called member sends an AddMember_End (or if the Context Broker coerces some policy requirement based on some finite number of the negotiation steps). This is an example of a peer to peer negotiation between the two intelligent members with the transaction actually governed by a central authority. Since the peer to peer negotiation is general, new services can be built without ever changing the basic context operations.

AddMember_Begin (NegotiationId, SrcInfo, ContextHandle, DestInfo)

AddMember_Invite (NegotiationId, SrcInfo, ContextHandle)

GenericNegotiate (ContextHandle, SrcInfo, DestInfo, NegotiationVal)

AddMember_End (NegotiationId, Result, ContextHandle, DestInfo, NegotiationVal)

4. DropMember: This transaction is used to drop a member from the context.

5. SuspendContextActivity: This transaction is used to suspend the activity of all members in the context.

6. ResumeContextActivity: This transaction is used to resume the activity of all members in the context who were previously suspended by SuspendContextActivity.

7. SuspendMemberActivity: This transaction is used to suspend the activity of the specified member in the context.

8. ResumeMemberActivity: This transaction is used to resume the activity of the specified member in the context who was previously suspended by SuspendMemberActivity.

9. SetOperation: This transaction is used to create/destroy/manipulate a set within the context. A set describes a notion of association between a subset of the context members. The maximum number of sets in a context is the power set of the context members. The set is usually used to model finer collaborations among the context members.

10. SetContextAttributes: This transaction is used to set the attributes of the context.

The protocol described above is a generic multiparty protocol. Race conditions are possible in the multiparty protocol if there is out of band communication. What follows is a description of the race condition ordering schemes and solutions that are supported by the present invention.

Figure 3:
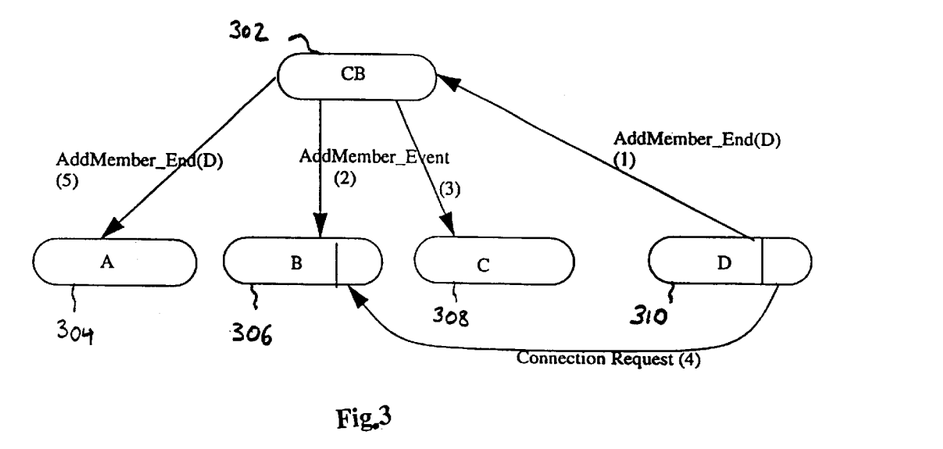
FIG. 3 is a block diagram depicting how a partial ordering of events is implemented in a preferred embodiment of the present invention.
Figure 4:
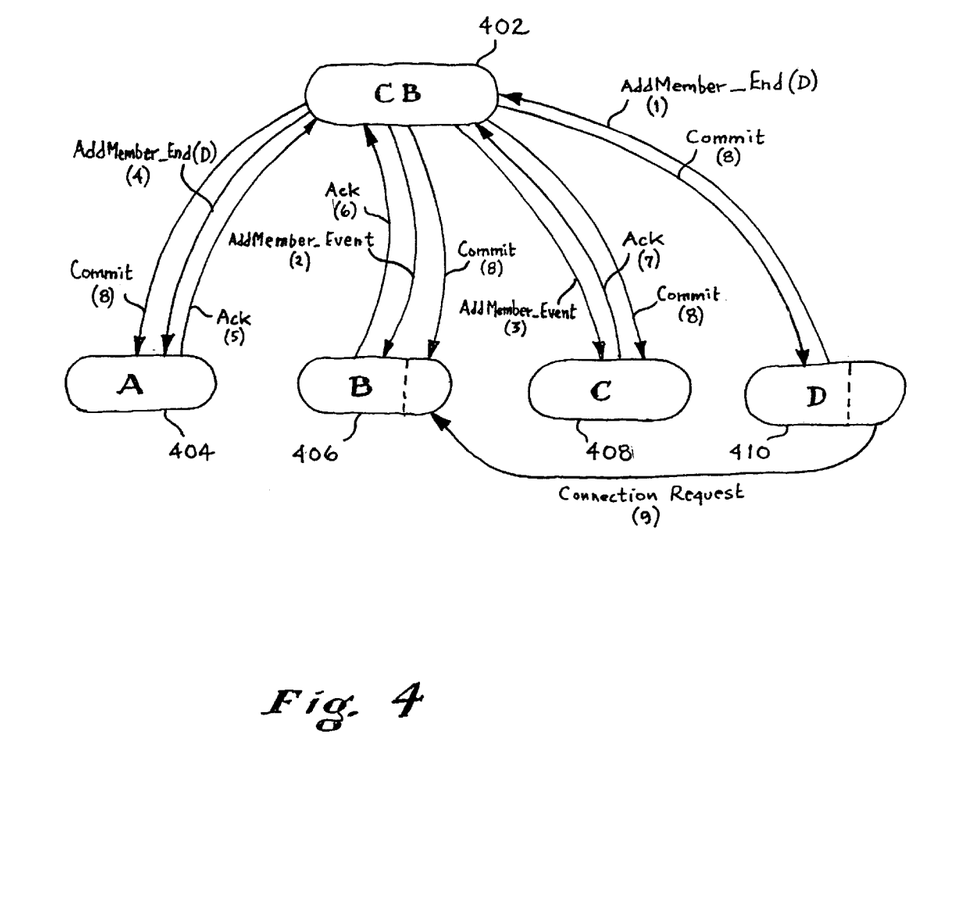
FIG. 4 is a block diagram depicting how a total ordering of events is implemented in a preferred embodiment of the present invention.

The Context Broker/Context Agent protocol supports two event ordering schemes: partial ordering and total ordering. The total ordering mechanism is more expensive than the partial ordering mechanism, although it will alleviate all race conditions in the protocol. Race conditions in the protocol can arise if entities involved in the negotiation attempt to have out of band communication based on a transaction termination (here out of band means communication bypassing the Context Broker). Partial ordering and total ordering are illustrated in FIGS. 3 and 4, respectively. Both figures depict a multiparty communication involving members (Context Agents) A, B and C who wish to add a new member, D.

Referring to FIG. 3, there is shown a multiparty communication session in accordance with the present invention. A Context Broker 302 is said to manage the communication session (Context X), which includes Context Agents 304, 306 and 308. Partial ordering of events will be considered for a scenario in which Agent 304 desires to add a new agent 310 (D).

After negotiations, the new member 310 sends the AddMember_End to the Context Broker 302 informing the Context Broker of its intent to commit the AddMember transaction. The Context Broker then has to broadcast the AddMember_Event to the other members (304, 306 and 308) of the Context to inform them that a new member has been added to Context X. Meanwhile, D has already assumed that it has been added as a member in the context and so it attempts to establish an out of band connection with B (for example, B could have been a passive server, and D's server agent might have attempted to connect to B's server port). B might not have received the AddMember_Event from the Context Broker yet and hence may not know if it should honor D's connection request. As a policy, B could have accepted the connection and deferred the integrity checking until it received the AddMember_Event (or a timeout). Thus, when implementing a partial ordering of events in a communication session, every member of the session should know how to handle the race condition.

Referring now to FIG. 4, the total ordering of events will be considered. In FIG. 4, as in FIG. 3, a Context Broker 410 manages a communication session (Context Y). The session concerns a multiparty communication between Context Agents 404, 406 and 408, with Agent 404 desiring to add a new agent 410 (D). When the new member D sends the AddMember_End, the transaction has not yet been "committed" by the Context Broker. No member can assume that the transaction has been "committed" until it receives a commit event from the Context Broker for this transaction.

The Context Broker sends the AddMember_Event to all the other members of the Context Y and waits for the acknowledgement ack (note that there is a timeout policy here in the Context Broker for the acknowledgement wait). After it receives the acknowledgement ack from all the members of the context, the Context Broker sends a commit event to all the members, including the newly added member. Any member may assume that the transaction has been "committed" only at this point. (Note that the Context Broker need not wait for the acknowledgement of the commit event.) Now if D attempts an out of band communication with B based on the previous transaction, B will honor the request appropriately.

Figure 5:
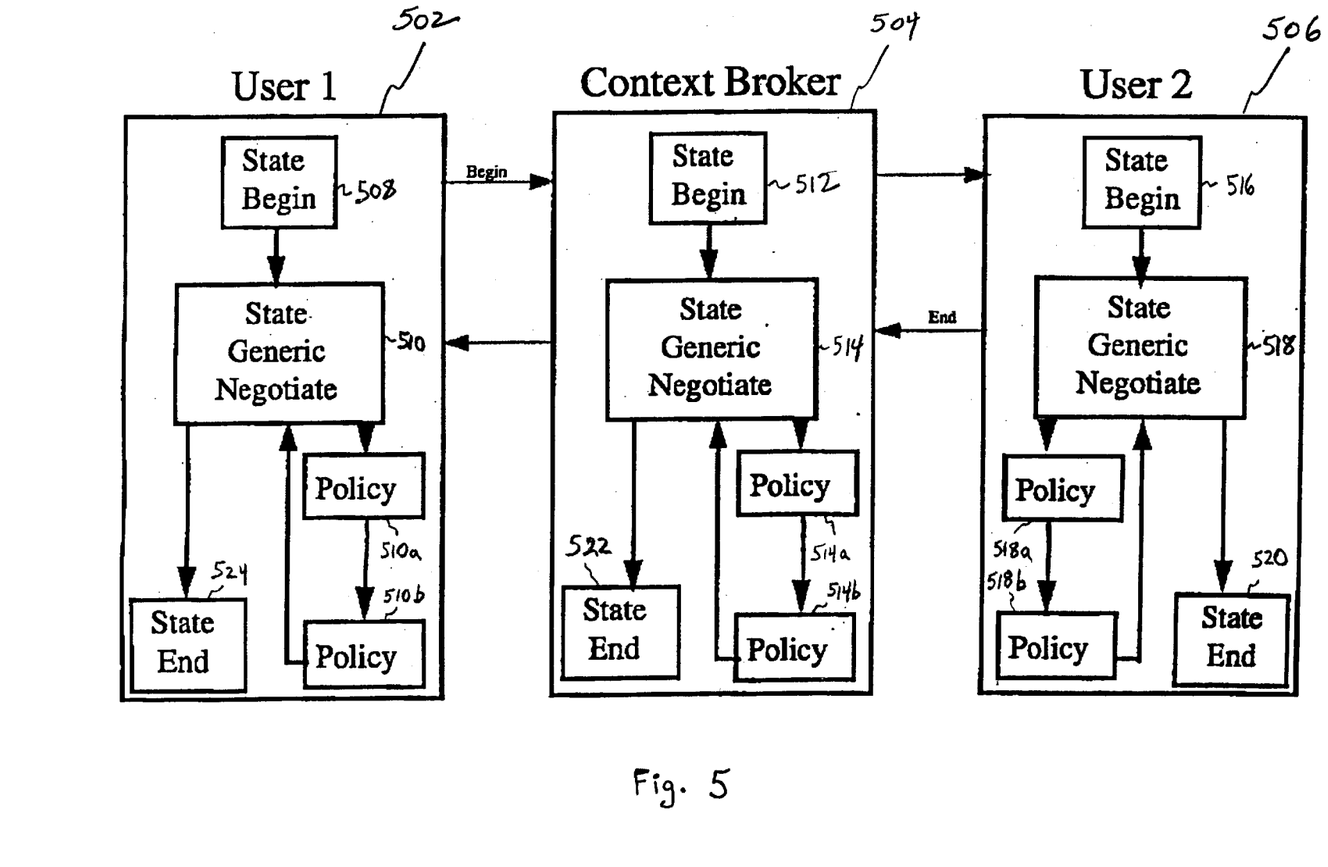
FIG. 5 is a flowchart depicting how the software modules in a preferred embodiment of the present invention interact.

FIG. 5 is a flowchart which shows how the software modules of a preferred embodiment of the present invention implement the negotiation broker-agent protocol described above. The embodiment depicted in the figure includes two agents, 502 and 506, denoted as "User 1" and "User 2", respectively, and a Context Broker 504. For purposes of illustration, it will be assumed that User 1 desires to negotiate (send and/or receive a series of messages) with User 2.

To initiate communication with User 2, User 1 executes a state begin operation (step 508) and enters into its GenericNegotiate state (step 510). The execution of step 508 results in the sending of a begin signal to the Context Broker. The Context Broker responds to the begin signal by executing its own state begin operation (step 512), sending a begin signal to User 2, and executing its own GenericNegotiate operation (step 514). User 2, in turn, executes its state begin (step 516) and GenericNegotiate (step 518) operations.

At this point, negotiations between users 1 and 2 can take place. In the embodiment of FIG. 5, User 1 negotiates directly with User 2. Therefore, the Context Broker merely acts as a conduit between the two Users. This stands in contrast to the alternative embodiment mentioned above, in which User 1 has the Context Broker negotiate with User 2 on User 1's behalf. Nevertheless, in the FIG. 5 embodiment, as the Users and Broker loop through their respective GenericNegotiate operations, they may each implement one or more "policies", or software routines that modify their GenericNegotiate operations. FIG. 5 shows the Users and the Broker implementing two policies each, 510a and 510b for User 1, 514a and 514b for the Broker, and 518a and 518b for User 2. Although the figure shows the Users and Broker implementing two policies each, it is possible for both the Users and Broker to implement any number or policies, or no policies at all. An example of a policy that a Broker might implement is: "after 5:00 pm there will be a three message limit on all negotiations".

At the completion of the negotiations, the Users and Broker enter their end state operations. Thus, User 2 recognizes the end of the negotiation and executes its end state operation (step 520) while sending an end notification to the Broker. The Broker, in turn, executes its end state operation (step 522) and sends an end notification to User 1. Finally, User 1 executes its end state operation (step 524).

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A communication system comprising:
   users comprising agents and brokers, wherein each of said users includes a computer running software;
   each of said brokers comprising means for establishing a communication session between two or more users of the communication system wherein at least one of said two or more users is an agent;

means for total ordering event distributions within the communication session by a broker that is maintaining the communication session, wherein said means for total ordering include means for sending a commit event message from the broker maintaining the communication session to each agent in the communication session only after receiving an acknowledgement of the event from each agent in the communication session, wherein the event is considered to have occurred at the point that the commit event message is sent; and means for altering said communication session in response to one or more negotiations among said two or more users; wherein each of said negotiations comprises one or more messages, and the number of messages within each of said negotiations is independently determined.

2. A communication method in a communication system comprising a plurality of users comprising agents and brokers, said method comprising the steps of:

establishing and maintaining, by a broker, a communication session between two or more users of the communication system wherein each of said users comprises a computer running software, at least one of the two or more users being an agent;

total ordering event distributions within said communication session by a broker that is maintaining the communication session, wherein said step of total ordering includes sending a commit event message from the broker maintaining the communication session to each agent in the communication session only after receiving an acknowledgement of the event from each agent in the communication session, wherein the event is considered to have occurred at the point that the commit event message is sent; and altering said communication session in response to one or more negotiations among said two or more users; wherein each of said negotiations comprises one or more messages, and the number of messages within each of said negotiations is independently determined.

3. A method for implementing a negotiation between two agents using a broker-agent protocol in a system comprising at least two agents and at least one broker, each of the at least two agents and at least one broker comprising a computer running software, the method comprising the steps of:

initiating, by a first agent of the at least two agents, a communication session for a negotiation between the first agent and a second agent of the at least two agents by executing a state begin operation and entering a generic negotiate state, the state begin operation of the first agent causing a begin signal to be sent from the first agent to a broker;

executing, by the broker, a state begin operation and entering the generic negotiate state, the state begin operation of the broker causing a begin signal to be sent from the broker to the second agent;

executing, by the second agent, a state begin operation and entering the generic negotiate state; and performing the negotiation between the first and second agents by transmitting at least one message between the first agent and the second agent when each of the first agent, the broker and the second agent are in the generic negotiate state.

4. The method of claim 3, wherein the first agent and the second agent send messages directly to each other.

5. The method of claim 3, wherein the broker sends messages to the second agent on behalf of the first agent.

6. The method of claim 3, further comprising the step of implementing a policy in the generic negotiate state of at least one of the first agent, the broker, and the second agent, the policy comprising a software routine that modifies operation of the generic negotiate state.

7. The method of claim 6, wherein the policy limits the number of messages which can be sent in one communication session.

8. The method of claim 3, further comprising the steps of:

recognizing, by the second agent, an end of the negotiation and executing an end state operation, the end state operation of the second agent causing an end notification to be sent to the broker;

executing, by the broker, an end state operation, the end state operation of the broker causing an end notification to be sent to the first agent; and executing, by the first agent, an end state operation.

* * * * *